(No Model.) 3 Sheets—Sheet 1.
M. BAYER.
CHRISTMAS TREE HOLDER.
No. 355,856. Patented Jan. 11, 1887.

Witnesses
Inventor
Martin Bayer
By his Attorney (No Model.)  3 Sheets—Sheet 2.

M. BAYER.
CHRISTMAS TREE HOLDER.

No. 355,856.  Patented Jan. 11, 1887.

Witnesses  Inventor
  Martin Bayer
  By his Attorney (No Model.) 3 Sheets—Sheet 3.

M. BAYER.
CHRISTMAS TREE HOLDER.

No. 355,856. Patented Jan. 11, 1887.

UNITED STATES PATENT OFFICE.

MARTIN BAYER, OF CHAMBERSBURG, NEW JERSEY.

CHRISTMAS-TREE HOLDER.

SPECIFICATION forming part of Letters Patent No. 355,856, dated January 11, 1887.

Application filed July 28, 1886. Serial No. 209,310. (No model.)

*To all whom it may concern:*

Be it known that I, MARTIN BAYER, a citizen of the United States, residing at Chambersburg, in the county of Mercer and State of New Jersey, have invented certain new and useful Improvements in Christmas-Tree Motors; and I do hereby declare the following to be a full, clear, and exact description of the invention, such as will enable others skilled in the art to which it appertains to make and use the same.

My invention relates to Christmas-trees, and has for its object to produce such a tree automatically operated and having working in connection a series of figures or ornamental devices, the whole tending to produce a pleasing effect to the eye and upon the mind, and serving at the same time as a means for advertising.

To the accomplishment of such ends the invention consists in the construction and the combination of parts hereinafter particularly described, and then sought to be specifically defined by the claims.

Figure 1:
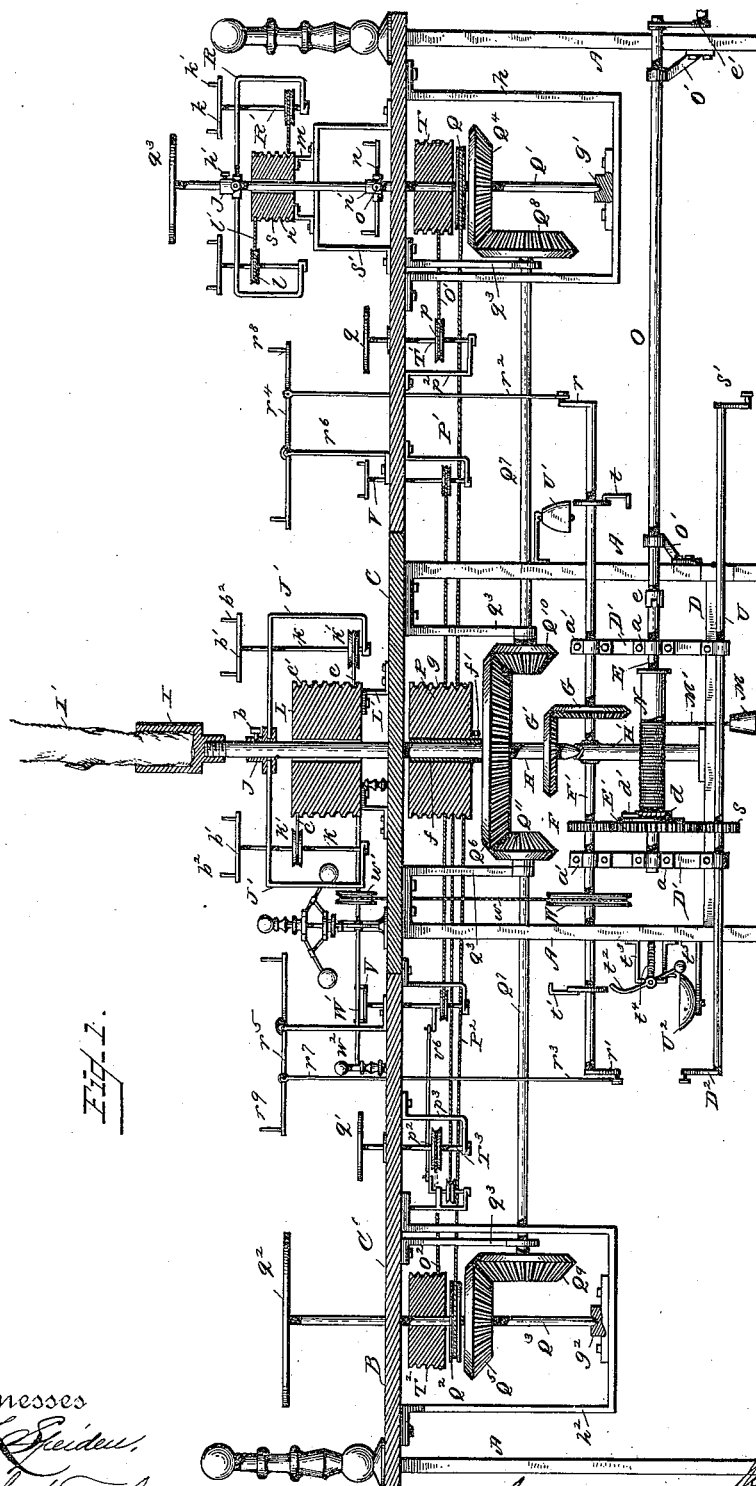
Figure 2:
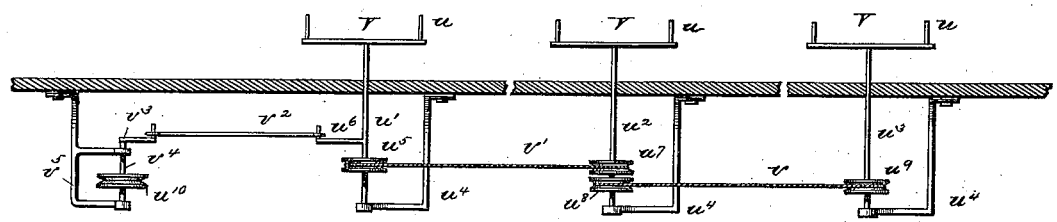
Figures 3, 4:
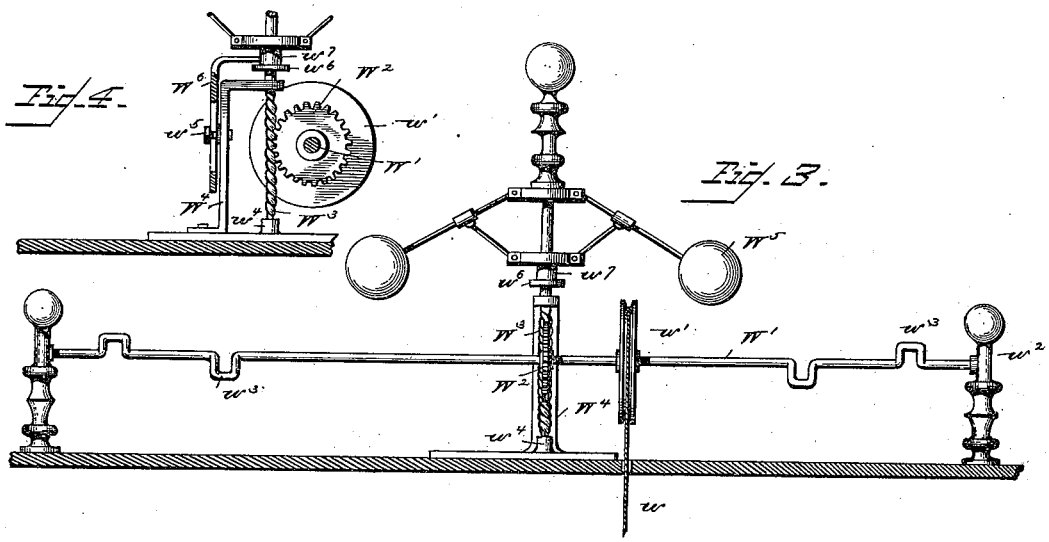
Figure 5:
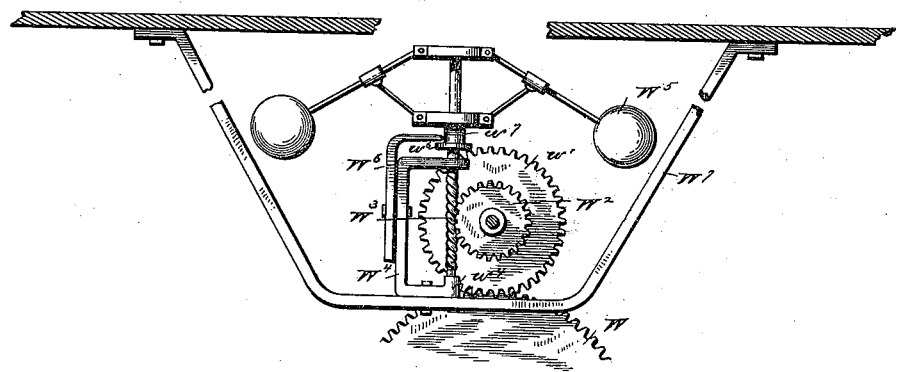
Figure 6:
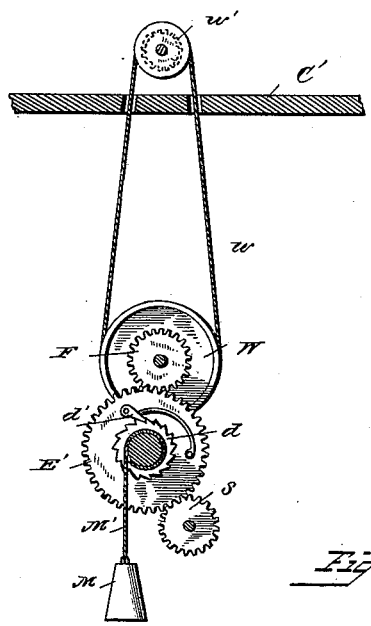
Figure 7:
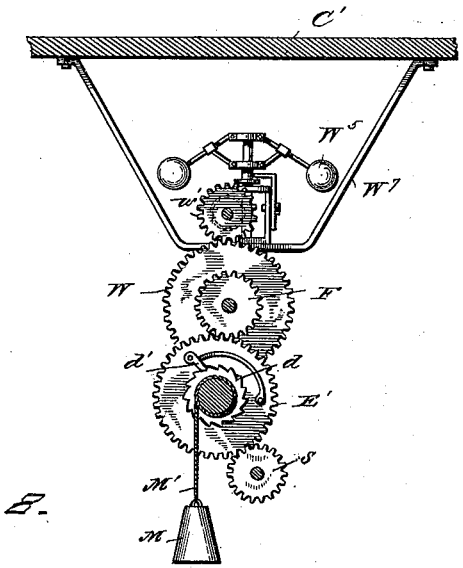
Figure 8:
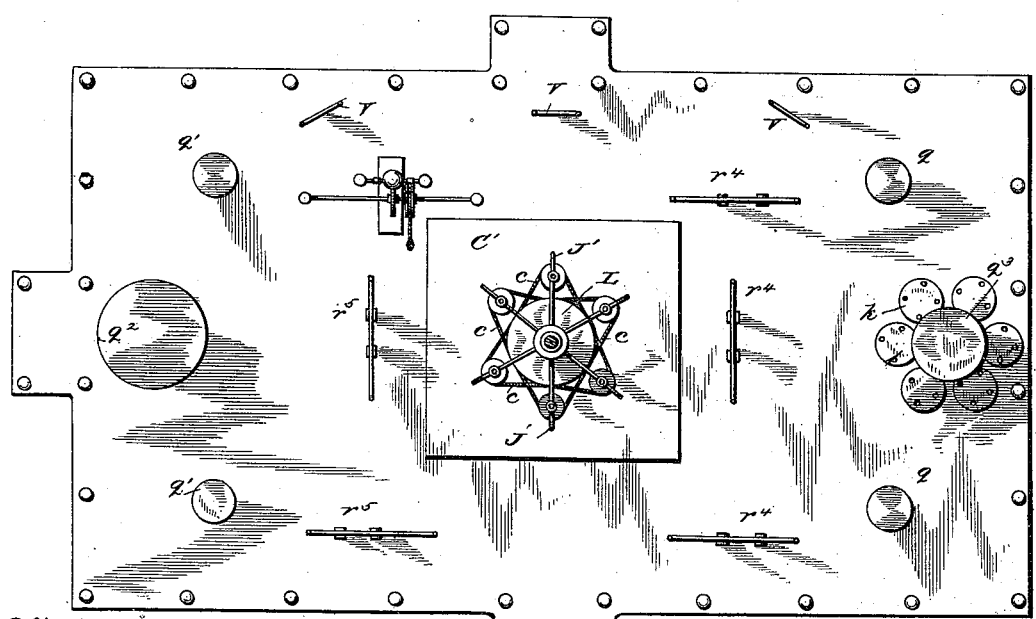

In the accompanying drawings, forming a part hereof, Figure 1 is a side elevation of the mechanism, parts thereof being in section. Fig. 2 is a detail view of the half-turn devices on an enlarged scale. Fig. 3 is a detail view of the governor mechanism on an enlarged scale. Fig. 4 is side view of a portion of Fig. 3. Fig. 5 is a modified form of attaching the governor mechanism. Fig. 6 is a detail view, showing one way of connecting the governor mechanism to other parts, on an enlarged scale. Fig. 7. is a detail view of another way of connecting the governor mechanism to the parts. Fig. 8 is a plan view of the mechanism.

In the drawings the letter A designates a frame-work or legs supporting a table or platform, B, which is formed of a central portion, C, and a surrounding portion, C', which may be removed from the portion C, so that only the latter will remain. From a cross-piece, D, there rise two standards, D', to which are secured boxes, a, in which is journaled a power-shaft, E, provided with a loose gear-wheel, E', which meshes with a pinion, F, on a shaft, F', journaled in boxes a', also secured to the standards D'. The shaft F' is also provided with a bevel-gear, G, which meshes with a bevel-gear, G', on the vertical shaft H, which is stepped at its lower end in the step H', and which extends up through the portion C' of the table, and is provided at its upper end with a box or cap, I, which may be screwed thereon, and which receives the stem or trunk I' of a Christmas-tree.

To the upper portion of the shaft H is secured, by a set-screw, b, or other means, a collar, J, which carries a spider or series of depending brackets, J', in the lower part of each of which is stepped, so as to turn, a vertical spindle or shaft, K, carrying at its upper end some suitable means—such, for instance, as a plate $b'$ and pins $b^2$—for the attachment thereto of a miniature human figure or other object. Each one of the shafts K is provided with a pulley, K', from which a rope, $c$, extends to and around a guide-sheave, L, supported above the table by legs L', and provided with as many grooves $c'$ as there are ropes $c$ leading to the pulleys K' for the ropes to lie in.

As the shaft H is revolved the brackets or spider J' are carried around with it, and the connection of the pulleys K' with the sheave L by bands or ropes causes the shafts K to revolve at a faster speed, and so that while the series of shafts, with their figures or objects, are carried in one direction each individual shaft will revolve in an opposite direction to the whole series or the brackets which support them, and in such way a pleasing effect is produced.

The main shaft and described train of mechanism has motion imparted thereto by any suitable power—for instance, by springs, by belts connecting with an engine or other source of power, or by weights, or by any other well-known means. In the drawings I have illustrated the power as imparted from a weight, M, suspended by a cord, M', which winds around a drum, N, secured to the shaft E, to turn therewith. This drum is provided with a ratchet, $d$, with which engages a pawl, $d'$, attached to the loose gear E', so as to lock the drum and gear together and cause both to turn when the rope is unwinding, and permit the drum to turn without moving the gear when the rope is being wound up. To wind up the rope there may be employed a rod, O, provided with a coupling, $e$, to engage one end of the shaft E, and with a crank, $e'$, by which it may be turned. To uncouple the rod and shaft the rod is moved longitudinally in the bracket O', in which it is supported.

The mechanism so far described can be used with the central portion, C', of the table without other mechanism, and is well adapted for use in show-windows and like places. It can, however, be used in connection with additional mechanism, and is usually so used where space will admit thereof. As additonal mechanism the following may be used: To the main shaft H, below the table, is attached a pulley, P, by means of a sleeve, $f$, and set-screw $f'$, which pulley is formed with as many grooves $g$ as there will be belts or ropes running therefrom to separate pieces of mechanism. One rope, P', extends to and around a pulley, Q, on a vertical shaft, Q', which turns in a step, $g'$, supported upon a bracket, $h$, suspended from the bottom of the table C. The shaft Q' extends above the table and has secured to it near its upper end by a set-screw, $h'$, a collar, $j$, which carries a spider or series of depending brackets, R, in the lower part of each of which is stepped, so as to turn a vertical shaft, R', carrying at its upper end suitable means—such as a plate, $k$, and pins $k'$—for the attachment thereto of a miniature human figure or other object.

Each shaft R' is provided with a pulley, $l$, connected by a rope or belt, $l'$, with a stationary sheave, S, formed with as many grooves $m$, as there are ropes. The effect is that the spider is carried in one direction by the main shaft and the vertical shafts R' turned in an opposite direction. The sheave S is supported by legs $m'$, resting upon a casing or frame, S', in which revolve a series of arms, $n$, secured to the shaft Q' by a collar, $n'$, and set-screw $o$, and designed to carry candles or other objects. The shaft Q' also carries a pulley, T, which connects by a belt, $o'$, with a pulley, $p$, on a vertical spindle, T', turning in a bracket, $p'$, and carrying at its upper end above the table a disk or plate, $q$, on which may be placed some object. There may be as many of these spindles as desired, but only two are shown in Fig. 1.

Another rope, P², extends from the pulley P to a pulley, Q², on a vertical shaft, Q³, supported at the opposite end of the table by a suspending-bracket, $h^2$, and turning in a step, $g^2$, secured to the bracket. This vertical shaft also has a pulley, T², from which a rope or belt, $o^2$, extends to and around a pulley, T³, on a spindle-shaft, $p^2$, which turns in a bracket, $p^3$, and extends above the table, where it is formed with a disk or plate, $q'$, on which some object may be set. There may be as many of these spindles as desired, although only one is seen in Fig. 1, the pulley T² being formed with as many grooves as there are belts extending to spindles or other pieces of the mechanism. The shaft Q³ may have a plate, $q^2$, and the shaft Q' a plate, $q^3$, for the support of some object.

There may also be used seesaws, formed by attaching cranks $r$ $r'$ to the horizontal shaft F', and extending pitmen $r^2$ $r^3$ from the crank-pins to a point above the table and connecting them to one end of the levers or rods $r^4$ $r^5$, fulcrumed to standards or posts $r^6$ $r^7$. The levers are provided with pins $r^8$ $r^9$ for the attachment of miniature figures. The cranks to the shaft F' are preferably arranged as shown, so that the seesaws will not work in unison.

A shaft, U, having a pinion, $s$, meshing with gear-wheel E', and provided with cranks $s'$ $s^2$ at its ends, may also be used for seesaws. The seesaw-shafts will be located so as not to interfere with one another, and so as to bring the seesaws at the desired points. This arrangement is a matter merely of mechanical skill, and I therefore do not limit myself to any number or to any arrangement.

An arm, $t$, connected with shaft F', strikes against a bell, U', in the rotation of the shaft, and rings it, and an arm, $t'$, connected to the shaft near its other end, strikes a clapper-lever, $t^2$, supported upon a bracket, $t^3$, so as to move it, and when the arm $t'$ leaves the lever a spring, $t^4$, throws it back and causes it to strike the gong U², supported upon a bracket, $t^5$, and sound the gong. There may be as many gongs and bells employed as desired.

There are also employed what I term "half-turns," because they make a half-revolution back and forth. These half-turns are designated by the letter V, and three are illustrated, although there may be more than that number, and each one will be provided with a miniature figure or object secured upon pins $u$, provided for the purpose. The spindles or shafts $u'$ $u^2$ $u^3$ of these half-turns rest at their lower ends in brackets $u^4$, suspended from the under side of the table, and the shaft $u'$ is provided with a pulley, $u^5$, and crank-arm $u^6$, the shaft $u^2$ with two pulleys, $u^7$ $u^8$, and the shaft $u^3$ with a pulley, $u^9$. A rope or band, $v$, connects pulleys $u^8$ and $u^9$, and another band, $v'$, pulleys $u^7$ and $u^5$, while a pitman, $v^2$, connects arm $u^6$ with the crank-arm $v^3$ of a shaft, $v^4$, supported in a bracket, $v^5$, and provided with a pulley, $u^{10}$, which connects by a band, $v^6$, with the main pulley P, from which power is derived. The proportionate length of the crank-arms $v^3$ $u^6$ is such that the arm $v^3$ will make a complete revolution while the arm $u^6$ makes a half-revolution, with the result of causing the three shafts $u'$ $u^2$ $u^3$ and their objects to make a half-revolution in one direction and then in the reverse direction.

A pulley, W, on the shaft F' connects by a band, $w$, with a pulley, $w'$, on a horizontal shaft, W', supported by posts $w^2$ above the table. This shaft is formed with cranks $w^3$, to which will be secured the hands of a miniature figure, so that a rising-and-falling back-and-forth movement will be imparted to the upper portion of the body of the figure.

In order to govern the speed of the mechanism, a gear-wheel, W², keyed to the shaft W', meshes with a vertical worm-shaft, W³, at its lower end resting in the step $w^4$, and its upper end supported by the overhanging arm of the standard $W^4$, extending up from the table. The throw of the governor-balls $W^5$, connected with the worm-shaft, is regulated by an arm, $W^6$, adjustable on the standard $W^4$ by the set-screw $w^5$, connected to the standard and fastened through a slot in the arm. The upper overhanging part of the arm extends over the flange $w^6$ of the sliding sleeve $w^7$ of the governor, so that by raising or lowering the arm the throw of the governor-arms can be more or less, and the speed accordingly increased or decreased.

Instead of using the belts $P'$ and $P^2$ and their pulleys Q and $Q^2$ to drive the vertical shafts, I may use bevel-gears $Q^4$ $Q^5$ $Q^6$ and shafts $Q^7$, supported in arms $q^3$ and carrying bevel-pinions $Q^8$ $Q^9$ $Q^{10}$ $Q^{11}$, meshing with the gears. I would, therefore, have it understood that wherever gear-wheels and shafts can be substituted for the pulleys and belts I regard them as equivalents.

Instead of having the governor above the table it may be below it, and may be connected with the parts by a train of gear-wheels, instead of by belts, as shown in Figs. 5 and 7. In such a case a bracket, $W^7$, will be connected to the under side of the table, and the standard $W^4$ will be supported thereon. The shaft $W'$ will also be below the table, and instead of having the pulley $w'$ will be provided with the gear-wheel $w^2$, which will engage with a gear-wheel, W, substituted for its equivalent pulley, bearing the same reference-letter and carried by the shaft $F'$.

Various other mechanical changes can be made—such as adding other parts, or omitting some of those shown, or changing their relation or position—without departing from the scope of my invention.

Having thus described my invention and set forth its merits, what I claim is—

1. The combination, with driving mechanism, of a spider-bracket connected to a vertical shaft, to revolve therewith, revolving spindles connected to said bracket, a stationary main sheave-pulley, and a belt leading from each spindle to said sheave-pulley, substantially as described.

2. The combination, with the main vertical shaft and driving mechanism, of a second vertical shaft, $Q'$, connected with said first shaft to revolve therewith, a spider-bracket connected to each of said shafts, revolving spindles connected to each of said brackets, a stationary sheave-pulley for each spider-bracket, and a belt leading from each spindle to the sheave-pulley of the respective shafts, substantially as described.

3. The combination, with a Christmas-tree-driving mechanism, of a crank-shaft, a standard carrying a beam fulcrumed between its ends to the standard above the table, and a pitman extending downward from the beam, and connecting said beam to the crank-shaft to form a seesaw, substantially as described.

4. The combination, with a main vertical shaft and one or more secondary vertical shafts connected with the main shaft and operated therefrom, of a series of revolving spindles, as $p$ or $p^2$, connected with and operated from said secondary shaft, and driving mechanism, substantially as described.

5. The combination, with the vertical shaft and driving mechanism, of a series of half-turns composed of vertical shafts, as $u'$ $u^2$ $u^3$, connected together, and means for moving them a partial revolution forward and then backward, said means being operated from the said vertical shaft, substantially as described.

6. The combination, with a Christmas-tree mechanism, of a shaft carrying a gear-wheel, a worm-shaft with which said gear-wheel engages, and governor-arms connected with said worm-shaft, the shaft carrying the gear-wheel being connected with other parts of the tree mechanism, whereby the movement of the mechanism is governed.

7. In a Christmas-tree mechanism, the combination of the governor worm-shaft $W^3$, the governor-arms collar $w^7$, formed with the collar $w^6$, the adjustable arm $W^6$, having one end engaging with the governor-arm collar to regulate the throw of the arms, a shaft operating in connection with the worm-shaft, and means connecting it with the driving mechanism, substantially as described.

8. The combination, with a Christmas-tree mechanism, of the crank-shaft $W'$, provided with gear-wheel $W^2$, means connecting said shaft with the driving mechanism of the apparatus, the worm-shaft $W^3$, having the governor-arms connected thereto and provided with the flanged collar $w^7$, and the adjustable arm $W^6$, engaged with said collar, substantially as described.

In testimony whereof I affix my signature in presence of two witnesses.

MARTIN BAYER.

Witnesses:
COURTLAND S. ROBBINS,
RICHARD S. CLINE.